United States Patent
Hennig et al.

(10) Patent No.: US 10,195,829 B2
(45) Date of Patent: Feb. 5, 2019

(54) DIRECTLY ADHERING, TRANSPARENT HEAT-SEALABLE BINDER FOR THE COATING AND SEALING OF TRANSPARENT PLASTICS FOILS

(71) Applicant: Evonik Roehm GmbH, Darmstadt (DE)

(72) Inventors: André Hennig, Ingelheim (DE); Bruno Keller, Wackernheim (DE); Juergen Hartmann, Darmstadt (DE); Thomas Arnold, Gelnhausen (DE); Michael Waldhaus, Reinheim (DE); Monika Maerz, Alzenau (DE)

(73) Assignee: Evonik Roehm GmbH, Darmstadt (DE)

( * ) Notice: Subject to any disclaimer, the term of this patent is extended or adjusted under 35 U.S.C. 154(b) by 0 days.

(21) Appl. No.: 15/597,893

(22) Filed: May 17, 2017

(65) Prior Publication Data
US 2017/0335141 A1 Nov. 23, 2017

(30) Foreign Application Priority Data
May 17, 2016 (EP) .................................... 16169889

(51) Int. Cl.
| | | |
|---|---|---|
| C09J 7/35 | (2018.01) |
| C09D 167/03 | (2006.01) |
| C09D 167/02 | (2006.01) |
| C08L 51/04 | (2006.01) |
| C08L 51/00 | (2006.01) |
| B32B 27/04 | (2006.01) |
| C08L 51/10 | (2006.01) |
| C08L 33/02 | (2006.01) |
| C09D 123/02 | (2006.01) |
| C09J 7/24 | (2018.01) |
| C09J 7/25 | (2018.01) |
| C09D 133/08 | (2006.01) |
| C09D 151/00 | (2006.01) |
| C09D 153/02 | (2006.01) |

(52) U.S. Cl.
CPC .............. *B32B 27/04* (2013.01); *C08L 33/02* (2013.01); *C08L 51/006* (2013.01); *C08L 51/04* (2013.01); *C08L 51/10* (2013.01); *C09D 123/02* (2013.01); *C09D 133/08* (2013.01); *C09D 151/006* (2013.01); *C09D 153/02* (2013.01); *C09D 167/02* (2013.01); *C09D 167/025* (2013.01); *C09D 167/03* (2013.01); *C08L 2666/24* (2013.01); *C08L 2666/66* (2013.01)

(58) Field of Classification Search
CPC . C09J 109/06; C09J 109/08; C09J 7/00; C09J 7/30; C09J 7/35
See application file for complete search history.

(56) References Cited

U.S. PATENT DOCUMENTS

| | | | |
|---|---|---|---|
| 7,498,373 B2 | 3/2009 | Schmitt et al. | |
| 8,025,758 B2 | 9/2011 | Loehden et al. | |
| 8,084,136 B2 | 12/2011 | Loehden et al. | |
| 2004/0116567 A1* | 6/2004 | Schmitt | B32B 15/08 524/284 |
| 2008/0057205 A1* | 3/2008 | Lohden | B32B 27/04 427/387 |
| 2008/0292893 A1* | 11/2008 | Loehden | C08F 283/01 428/458 |
| 2017/0260433 A1* | 9/2017 | Hennig | C08F 255/04 |

FOREIGN PATENT DOCUMENTS

| | | |
|---|---|---|
| DE | 101 50 898 A1 | 8/2002 |
| DE | 10 2006 009586 A1 | 9/2007 |
| DE | 10 2014 208 608 A1 | 11/2015 |
| WO | 2006/134042 A1 | 12/2006 |

OTHER PUBLICATIONS

Hennig et al., pending U.S. Appl. No. 15/309,698, filed Nov. 8, 2016 (corr. to DE 10 2014 208 608 A1).
European Search Report dated Aug. 11, 2016 in corr. European Patent Application No. 16169889.9 (w/ English Translation of Categories of Cited Documents ).

* cited by examiner

*Primary Examiner* — Christopher M Rodd
(74) *Attorney, Agent, or Firm* — Oblon, McClelland, Maier & Neustadt, L.L.P.

(57) ABSTRACT

A transparent, heat-sealable coating for transparent PET packaging foils can be provided by using a heat-sealable lacquer based on styrene-containing copolymers, on poly (meth)acrylates, on at least one polyester and optionally on a tackifier, and also the process for the sealing of a foil coated with this lacquer. It is surprising here that, despite the use of a rubber based on styrene-containing polymers that is not optically compatible with polyesters and polymethacrylate, the transparency of the heat-sealable coatings is still very high.

12 Claims, No Drawings

DIRECTLY ADHERING, TRANSPARENT HEAT-SEALABLE BINDER FOR THE COATING AND SEALING OF TRANSPARENT PLASTICS FOILS

BACKGROUND OF THE INVENTION

Field of the Invention

Transparent food packaging is of constantly increasing importance in all food sectors because it allows direct viewing of the food by the consumer during purchase. Optical properties are utilized specifically by food producers to improve marketing of their products. Packaging is increasingly produced not only from polyolefinic materials (PE, PP, PS) but also from transparent polyethylene terephthalate (PET) or from other polyesters, for example polybutylene terephthalate (PBT), polylactic acids (PLA) or polytrimethylene terephthalate (PPT). For reliable sealing of this packaging, transparent binders which do not impair the desired appearance of the food are also needed. The polyester foil here can be sealed by way of example with respect to polystyrene containers, PVC containers and polyester containers. The binders here feature not only good seal seam strength values but in particular good transparency and also excellent application characteristics.

Description of the Related Art

Lids used for sealing plastic containers alongside the traditional aluminium lids in food technology, in particular in the case of dairy products, examples being yogurt pots, are mainly lids made of a polyester, in particular of polylactic acid (PLA) or of amorphous polyethylene terephthalate (PET36 foil). In order to provide sealing and at the same time to provide the aroma barrier between the food and the foil material, these lids are used after coating with a sealable lacquer.

A requirement that has already existed for a very long time in this market is sealing of transparent PET foils. Lid materials of this type provide access to new-look food packaging. However, when prior-art heat-sealable lacquers are used it is not yet possible to provide this type of packaging and at the same time to provide very good seal seam strength values, because heat-sealable coatings that have been described have insufficient transparency for these applications.

Sealing of PET foils is usually achieved by means of polyvinyl acetate or polyethylene/polyvinyl acetate, or by means of polyester lacquers. Although these systems are transparent, they do not have ideal heat-seal-seam-strength values, sometimes requiring mixture with adhesion promoters such as PVC copolymers in order to achieve adhesion on the foil, and cannot achieve sealing with respect to a variety of pot materials.

DE 35 31 036 describes plastics foils which can be produced by coextrusion and which are composed of a sealable layer made of impact-resistant polystyrene, a block copolymer and a lubricant. Again, this system cannot be produced in transparent form, even if the actual PET foil has very high transparency. It is moreover known that, because of lower seal seam strength, coextruded foils are less preferred in relation to the seal seam strength values to be achieved than coated systems in which the lacquer can undergo a desired microphase separation during drying.

It was an object of EP 0 406 681 to improve the polystyrene-based foils that can be produced by the coextrusion process according to DE 35 31 036 inter alia with the aim of increasing processing latitude and processing reliability. According to EP 0 406 681, these requirements were met via a sealable plastics foil produced by the coextrusion process or via lamination, made of two layers A and C and optionally of a layer B and also optionally in each case a layer of an adhesion promoter D. However, these systems are complicated to produce and are also not transparent.

EP 1 891 174 and EP 1 989 258 in turn describe heat-sealable dispersions composed of at least one polyolefin, one polymethacrylate, one polyester and one polyolefin-graft-polymethacrylate copolymer. The dispersion according to EP 1 891 258 here additionally comprises a polyester-graft-polymethacrylate copolymer. However, the proportion of polyolefin here is in each case at least 10% by weight, based on the solids content of the dispersions. Although it is thus also possible to seal not only aluminium foils but also PET foils with respect to polypropylene (PP) as pot material, the coatings have almost no transparency, and are produced by a process that is complicated and therefore expensive. This inhibits widespread use.

EP 2 495 282 in turn describes a heat-sealable dispersion for closure of PET foils with respect to polystyrene pots. This dispersion comprises exclusively polyester, poly(meth) acrylates and polyester-graft-polymethacrylate copolymers. However, it has been found that these dispersions have only relatively short shelf life.

In relation to heat-sealable layers based on a lacquer system it can in principle be said that none of the binders hitherto commercially available can meet the requirements placed upon optical properties while at the same time ensuring the necessary sealable properties, in particular heat-seal-seam-strength values, universal sealability and ease of opening. There is moreover no existing transparent, PVC-free binder that adheres directly on a polyester foil.

In principle it is also possible and preferable to use extrusion technology to produce heat-sealable coatings. It is thus generally possible to achieve a high level of success in relation to transparency of the heat-sealable layer and reliable closure. Examples of materials used for this purpose are polyolefins, e.g. PE or PP, modified polyolefins, e.g. EMA, EMAA or EAA, and ethylene-vinyl acetate copolymers. Disadvantages of this technology are the complex structure of the foils and, associated therewith, difficult control of the production process on the one hand and, on the other hand, non-uniform opening of packaging thus sealed, in turn resulting in consumer dissatisfaction. The various sealable layers moreover do not adhere directly on the foils used.

In contrast, a lacquer system has the advantage of more flexible use with smaller gap sizes, and is therefore still widely used, particularly in Europe. A lacquer system of this type often achieves inadequate transparency, and is moreover only suitable for aluminium foils and PET foils.

SUMMARY OF THE INVENTION

It was an object of the present invention to provide, through development and formulation of suitable polymers, PVC-free heat-sealable lacquers suitable for sealing PET foils and PET-coated foils with respect to various pot materials, in particular with respect to polystyrene, polyester or PVC, with transparent appearance.

The polyesters of the foil material here are in particular composite paper-polyethylene-terephthalate materials, single-side aluminium-laminated PET foils (AluPET), polylactic acid (PLA), and also foils made of amorphous polyethylene terephthalate (e.g. PET36).

A particular object of the present invention was that, in comparison with the related art, the coating with the heat-sealable lacquer on the pot material has markedly better transparency together with high seal seam strength values and uniform peel behaviour during opening ("smooth peel"). The meaning of improved transparency here is that the haze of this layer in a thickness conventional for a heat-sealable coating is to be smaller than 15%, ideally smaller than 6%.

Another object was to achieve adequately high closure strength values while using the usual cycle times for heat-sealing of plastics foils. The foil coated with the material here is to be sealable with respect to various materials, particular examples being PET, polystyrene (PS), PLA and also polypropylene (PP).

A particular intention here is that the packaging has a secure closure, but in turn can also be opened easily and uniformly ("smooth & easy peel"). The binders must moreover have, alongside the heat-sealable properties, a processable dynamic viscosity of from 1000 to 5000 mPas together with maximized solids contents above 35% by weight, and must be price-competitive.

Another object was to achieve high line speeds during sealing with the novel material, and to permit use of rapid-drying solvents.

Another object was to achieve high bond strength even at relatively high temperatures directly after sealing (high heat resistance), because this achieves short cycle times for the food packager during sealing of the foil.

Other problems not explicitly mentioned will be apparent from the entirety of the description, claims, and examples below.

DETAILED DESCRIPTION OF THE PREFERRED EMBODIMENTS

Achievement of Object

The objects are achieved via a heat-sealable coating system suitable for the sealing of various types of substrates and comprising a film-forming dispersion, characterized in that this dispersion comprises a total of from 25% by weight to 65% by weight, preferably from 35% by weight to 60% by weight and particularly preferably from 40% by weight to 55% by weight, of a mixture of components A, B and C, where the total solids content of the dispersion is from 25 to 70% by weight. This mixture is characterized here by the following composition:

from 15% by weight to 50% by weight, preferably from 25% by weight to 45% by weight and particularly preferably from 30% by weight to 40% by weight, of a polyester or polyester mixture as polymer type A, from 15% by weight to 50% by weight, preferably from 25% by weight to 45% by weight and particularly preferably from 30% by weight to 40% by weight, of a poly(meth)acrylate or mixture of two or more poly(meth)acrylates as polymer type B and from 15% by weight to 40% by weight, preferably from 20% by weight to 35% by weight and particularly preferably from 25% by weight to 30% by weight, of one or more rubbers having repeating styrene units as polymer type C.

The proportions of components A, B and C in the mixture here are in each case based on the entire composition of the polymer types A, B and C. Components A, B and/or C here can also entirely or to some extent take the form of graft copolymers AB and/or CB. It is preferable that the mixture is composed of the polymer types A, B and C and of the graft copolymers AB and CB formed therefrom.

In particular, it has surprisingly been found that this dispersion has very good heat-sealing properties while comprising the polymer type C. According to the invention, this polymer type C is an SEBS, a grafted SEBS, an SEB, a copolymer predominantly composed of styrene and (meth) acrylates having at least 12 carbon atoms as alkyl moiety, or is a mixture of at least two of these components.

With particular preference the polymer types AB and CB are grafted copolymers having a main chain made of polyester and, respectively, of rubber, and having pendant chains made of poly(meth)acrylate. It is by way of example entirely possible here that the composition of the pendant chains B of a polyester-graft-poly(meth)acrylate AB differs from that of the pendant poly(meth)acrylate chains B grafted onto a rubber C in a graft copolymer CB.

It is particularly preferable that the suitable binder is composed of a mixture of a high-molecular-weight adhesive polyester, a rubber, a polymethacrylate composed of methyl methacrylate and butyl methacrylate, and a graftable, medium-molecular-weight polyester (an embodiment of the polymer type A1). Peel properties can also be adjusted by using a tackifier based on polyolefins or on polyesters (in this case as polymer type A2). Suitable solvents are in particular propyl acetate, other acetic esters, methyl ethyl ketone (MEK) and mixtures of these. This binder can coat various polyester foils, for example aluminium-metallized PET foil (AluPET), composite foil made of paper and metallized PET and PET foils of various thicknesses, and also aluminium foils, and can seal these to transparent PET pots or transparent PS pots. The transparency of the coated PET36 foil is in the range below 15% haze, preferably <10% haze. Heat-seal strength is >6.0 N/15 mm for sealing of PET36 to APET.

Surprisingly, it has been found that use of the dispersion of the invention as heat-sealable coating with the usual cycle times used during heat-sealing of plastics foils achieves sufficiently high closure strength values. High bond strength, and attendant high heat resistance, was moreover achieved even at relatively high temperatures directly after sealing. It is thus possible to achieve short cycle times during sealing.

Other advantages of the composition of the invention are good adhesion on various commercially available polyester foils, for example with respect to PS, examples being mixpap, PET36, and AluPET, or indeed on aluminium-foil foils.

Other advantages can be seen in peel behaviour on opening, examples being smooth peel and the complete absence of cobwebbing.

The coating of the invention moreover has better transparency than existing heat-sealable coatings, although the binder itself does not exhibit improved transparency. The compositions of the invention are moreover available by way of a relatively simple production process.

The Polymer Type A

The person skilled in the art is in principle easily capable of selecting the polyesters of the polymer type A that are suitable for the coating composition of the invention. A very wide range of polyesters can be used here. Selection criteria available to the person skilled in the art are in particular the solubility of the polyester in the respective solvent and—for applications with food contact—the appropriate approval of this component under food legislation.

Materials that can preferably be used as polymer type A in the invention are on the one hand copolyesters which feature itaconic acid as monomer unit (polyester A1). Equal preference is on the other hand given according to the invention to use of polyesters which are free from monomers comprising polymerizable double bonds and whose number-average molar mass ($M_n$) is greater than 5000 g/mol (polyester A2), and which thus bring about the adhesion to the PET foil.

In a particularly preferred embodiment of the present invention, the polymer type A is a mixture of the polyester A1 with number-average molar mass $M_n$ from 700 to 5000 g/mol, preferably from 2000 to 4000 g/mol, produced with copolycondensation of itaconic acid, and of the polyester A2 with number-average molar mass $M_n$ from 5000 to 50 000 g/mol, preferably from 10 000 to 35 000 g/mol, which has no double bonds. The optional component of the polymer type AB here comprises exclusively polyester A1 as polymer type A.

In particular, this preferred coating system comprises, based on the entire composition of the polymer types A, B and C, inclusive of the optional constituents AB and CB, including the proportions of the polyester A1 in polymer type AB, from 1 to 15% by weight, preferably from 5 to 12% by weight, very particularly preferably from 7 to 10% by weight, of the polyester A1 and from 10 to 50% by weight, preferably from 20 to 40% by weight, very particularly preferably from 25% by weight to 35% by weight of the polyester A2.

As alternative to the said particularly preferred embodiment, the coating system can also comprise other polymer types A which are entirely, or else only to some extent, a polyester which has been produced with copolycondensation of itaconic acid and which particularly preferably has properties the same as those described above for the polyester A1. It is moreover alternatively possible that none of the polyesters used has any double bonds and that therefore none of these is available for any grafting. This type of system, which is equally inventive, would then comprise no graft copolymers AB. There are moreover also other possible variants complying with the other requirements placed upon the polymer type.

It is preferable that the polyesters A1 have a linear or branched structure and are characterized by OH numbers of from 20 to 150 mg KOH/g, preferably from 25 to 50 mg KOH/g, acid numbers below 10 mg KOH/g, preferably below 5 mg KOH/g and particularly preferably below 2 mg KOH/g and number-average molar mass from 700 to 5000 g/mol, preferably from 2000 to 4000 g/mol. The hydroxy number (OHN) is determined in accordance with DIN 53240-2. Acid number is determined in accordance with DIN EN ISO 2114. Molar mass is determined by gel permeation chromography (GPC). The samples were characterized in tetrahydrofuran eluent in accordance with DIN 55672-1.

The content of itaconic acid in the polyesters A1 can in particular be in the range from 0.1 mol % to 20 mol %, preferably from 1 mol % to 10 mol % and very particularly preferably from 2 mol % to 8 mol %, based on the total quantity of polycarboxylic acids used. In other respects, the nature of the polycarboxylic acids used for the copolyesters of the invention is per se as desired. It is thus possible that aliphatic and/or cycloaliphatic and/or aromatic polycarboxylic acids are present. The expression "polycarboxylic acids" means compounds which preferably bear more than one, and particularly preferably two, carboxy groups; a difference from the generally accepted definition is that in particular embodiments the said expression also covers monocarboxylic acids.

Examples of aliphatic polycarboxylic acids having relatively short chains are succinic acid, glutaric acid, adipic acid, azelaic acid, sebacic acid, dodecanedioic acid, tetradecanedioic acid and octadecanedioic acid. Examples of cycloaliphatic polycarboxylic acids are the isomers of cyclohexanedicarboxylic acid. Examples of aromatic polycarboxylic acids are the isomers of benzenedicarboxylic acid and trimellitic acid. It is also optionally possible to use, instead of the free polycarboxylic acids, the esterifiable derivatives thereof, e.g. corresponding lower alkyl esters, or cyclic anhydrides.

The nature of the polyols used for the hydroxypolyesters of the invention is per se as desired. Aliphatic and/or cycloaliphatic, and/or aromatic polyols can thus be present. The expression "polyols" means compounds which preferably bear more than one, particularly preferably two, hydroxy groups; a difference from the generally accepted definition is that in particular embodiments the said expression also covers monohydroxy compounds.

Examples of polyols are ethylene glycol, 1,2-propanediol, 1,3-propanediol, 1,4-butanediol, 1,5-pentanediol, 1,6-hexanediol, 1,9-nonanediol, 1,12-dodecanediol, neopentyl glycol, butylethyl-1,3-propanediol, methyl-1,3-propanediol, methylpentanediols, cyclohexanedimethanols, trimethylolpropane, pentaerythritol, and mixtures thereof.

The expression "aromatic polyols" means reaction products of aromatic polyhydroxy compounds, for example hydroquinone, bisphenol A, bisphenol F, dihydroxynaphthalene, etc. with epoxides, for example ethylene oxide or propylene oxide. Polyols present can also be etherdiols, i.e. oligomers or polyomers based by way of example on ethylene glycol, propylene glycol, or 1,4-butanediol. Particular preference is given to linear aliphatic glycols.

The synthesis of the hydroxy polyesters can use not only polyols and dicarboxylic acids but also lactones.

The polyesters A1 of the invention are produced by methods traditionally used for (poly)condensation reactions.

The polyesters A2, equally preferred for the purposes of the invention, in particular have a linear or optionally slightly branched structure and are preferably characterized by an OH number of from 1 to 15 mg KOH/g, preferably from 5 to 10 mg KOH/g, an acid number below 10 mg KOH/g, preferably below 5 mg KOH/g and particularly preferably below 2 mg KOH/g and number-average molar mass $M_n$ from 5000 to 50 000 g/mol, preferably from 10 000 to 35 000 g/mol. The glass transition temperature ($T_g$) of the polyesters A2 is moreover particularly advantageously in the range from 25 to 45° C., preferably from 30 to 35° C. Glass transition temperature is measured by DSC (differential scanning calorimetry) in accordance with DIN EN ISO 11357-1. The values stated are taken from a second heating cycle.

In the case of the materials of the polyester A2 type, it is essential that no monomers are used which comprise double bonds amenable to polymerization with (meth)acrylates; this means by way of example absence of itaconic acid.

In other respects, production of the polymer type A type 2 can generally use monomers the same as those mentioned above in the description of the type 1.

The Polymer Type B

The polymer type B can by way of example be formed alongside the graft copolymer AB during production of the dispersion of the invention. The composition of these B chains in the optional product constituent AB likewise corresponds to the description below. The same applies to the B chains of an optional constituent CB. It is entirely possible here that the individual components B differ from one another, and/or it is equally possible that a plurality of different polymers of the composition B are present alongside one another. It is preferable that the following applies to the composition of all of these constituents B:

Polymer types B are defined as composed of polyacrylate sequences and/or polymethacrylate sequences. These materials per se, e.g. in the form of a corresponding homo- or copolymer, are soluble in the solvent system L. The polymer B is generally composed of standard methacrylates and optionally acrylates. Polymer type B is in particular composed of MMA, butyl (meth)acrylate, ethyl (meth)acrylate and/or propyl (meth)acrylate. The wording "(meth)acrylate" here means methacrylates, acrylates or a mixture of methacrylates and acrylates. Other suitable monomers for the polymer type B can be found by way of example in EP 1 989 258, but the functional monomers likewise listed in that document are restricted according to the invention to OH functionalities, acid functionalities, and silyl functionalities.

It is particularly preferable that the polymer type B is a copolymer obtained by copolymerization of a monomer mixture. It is particularly preferable that this polymer mixture is composed here of components selected from (meth)acrylic acid, hydroxyethyl (meth)acrylate, hydroxypropyl (meth)acrylate, methyl (meth)acrylate, n- and/or isopropyl (meth)acrylate, n-butyl (meth)acrylate and C8- to C22-fatty alcohol esters of (meth)acrylic acid.

It is very particularly preferable that more than 50% by weight, with preference from 80% by weight to 100% by weight, of polymer type B is composed of MMA and/or butyl methacrylate.

In order to provide an additional increase in heat-seal strength with respect to particular materials, there can be up to 20% by weight, preferably up to 10% by weight and particularly preferably from 0 to 5% by weight of copolymerized functional monomers present. These functional monomers can by way of example be acids, in particular acrylic acid, methacrylic acid, or itaconic acid. Somewhat less preference is given to monomers having an OH group, for example in particular 2-hydroxyethyl (meth)acrylate or 3-hydroxypropyl (meth)acrylate.

Polymer type B can moreover comprise chain-transfer agents in order to establish the desired range of molecular weight. Examples that may be mentioned of sulphur-containing chain-transfer agents are MTMO, (3-mercaptopropyl)trimethoxysilane and n-DDM (n-dodecyl mercaptan).

The specific proportion and composition of the polymer B is advantageously selected with a view to the desired technical function.

Component B can also in particular take the form of mixture of various poly(meth)acrylates, where only one of these various (meth)acrylate compositions forms the constituents B of the polymer component AB and, respectively, CB.

The Polymer Type C

According to the invention, the polymer type C is an SEBS, a grafted SEBS, an SEB, a copolymer composed predominantly of styrene and (meth)acrylates having at least 12 carbon atoms as alkyl moiety, or is a mixture of at least two of these components.

It is preferable that component C is an SEBS, is an SEBS grafted with acrylic acid, with methacrylic acid, with maleic acid and/or with maleic anhydride, is a mixture of SEBS and SEB or is a copolymer predominantly composed of styrene and also of (meth)acrylate esters of a fatty alcohol having at least 12 carbon atoms or of a hydrogenated, hydroxy-terminated polybutadiene. The latter alternative has proved to be particularly advantageous when the material is the ester of a hydrogenated, hydroxypropyl-terminated polybutadiene.

Irrespective of other aspects of the composition of the polymer type C, a proportion of repeating styrene units in component C of from 8 to 45% by weight, preferably from 10 to 35% by weight, has proved to be particularly advantageous.

Irrespective of the above, and also in addition thereto, a particularly advantageous melt flow index of component C, measured with a 5 kg load at a temperature of 200° C. in accordance with ISO 1133-1, is from 1 to 40 g/10 min, preferably from 4 to 10 g/10 min. Melt flow index is a quantity that can be determined relatively easily and precisely and that reflects the vital combination of chain length, chain length distribution and microstructure of the polymers of the polymer type C. Surprisingly, these properties and the combination thereof also appear to influence heat-sealing properties.

SEBS is a triblock copolymer having exterior blocks entirely or predominantly composed of repeating styrene units. In contrast, the middle block is a copolymer composed predominantly or entirely of repeating ethylene units and repeating butene units.

SEB is, analogously thereto, a diblock copolymer having only one block composed predominantly or entirely of repeating styrene units.

Both SEB and SEBS are available commercially in the form of pure polymers. An example of a pure SEBS is Kraton G-1650 E from Kraton. However, the two polymers are also often marketed in the form of a mixture of SEBS and SEB. Particularly suitable examples are Kraton G-1657 with about 30% by weight SEB content and Kraton G-1726 with about 70% by weight SEB content.

The Polymer Type AB
Production of the Optionally Present Graft Polymers AB

The process of the invention for the production of a graft copolymer AB features reaction of a suitable initiator described at a later stage below with graftable groups, in particular with double bonds of repeating itaconic acid units in the polymer of the type A, to form reactive centres for free-radical polymerization of (meth)acrylates. The expression "reactive centres" means polymer chains which comprise one or more initiator units for free-radical polymerization. These initiator units can be formed simultaneously or else at different times. It is thus also very possible that itaconic acid units are activated only after other free radicals formed at other itaconic acid units have been deactivated by termination reactions.

The graft polymer AB is generally produced by grafting, on the component A under reaction conditions suitable for this purpose, monomers that lead to the component B. Correspondingly, the polymer type AB is preferably a graft copolymer having a main chain made of polyester and a pendant chain made of poly(meth)acrylate.

By way of example, a solution of strength from 10 to 65% by weight, preferably from 30 to 45% by weight, of an itaconic-acid-containing polyester is produced in a suitable solvent which is inert under polymerization conditions and which normally has a boiling point above the process temperature. Examples of solvents that can be used are acetic esters such as ethyl, propyl or butyl acetate, aliphatic solvents such as isooctane, cycloaliphatic solvents such as cyclohexane, and carbonylic solvents such as butanone.

The monomers that lead to the polymer type B are added to these polyester solutions, and polymerization is carried out with addition of one or more preferably peroxidic free-radical initiators at temperatures of from −10° C. to 100° C. within a period that is usually from 4 to 8 hours. It is desirable to maximize conversion. Free-radical initiator used is preferably an azo compound such as AIBN or peresters such as tert-butyl perocotate. The initiator concentration depends on the number of desired grafting sites, and on the desired molecular weight of the segment B. Initiator concentration is generally from 0.1 to 3% by weight, based on the polymer.

It is also possible to make concomitant use of chain-transfer agents in order to establish the desired molecular weight of the segments B. Examples of suitable chain-transfer agents are sulphur chain-transfer agents, in particular chain-transfer agents comprising mercapto groups, e.g. the chain-transfer agents described in the section relating to polymer type B. The concentrations of chain-transfer agents are generally from 0.1% by weight to 1.0% by weight, based on the entire polymer.

The graft copolymers of the polymer type AB can be synthesized not only by the solution polymerization method described but also in bulk. For this, the polyesters are dissolved in the (meth)acrylic monomer mixture before free-radical polymerization is initiated.

Free-radical initiator can alternatively also be used as initial charge in a melt of the polyester, the monomer mixture then being admixed therewith.

The Polymer Type CB

The graft polymer CB is generally produced by producing—optionally with the aid of a suitable emulsifier—a dispersion of component C and grafting, onto this under reaction conditions suitable for this purpose, monomers that lead to polymer type B. Processes for the production of suitable emulsifiers of the type CB are known per se: by way of example it is possible to proceed by the transfer grafting method: (cf. also Houben-Weyl, Methoden der Org. Chemie [Methods of organic chemistry], Vol. 1411, p. 114, H. A. J. Battaerd, G. W. Tregear, Polymer Reviews, Vol. 16, Interscience (1967)).

By way of example, a solution of strength from 10 to 50% by weight, preferably from 20 to 40% by weight, of a polymer of the polymer type C is produced in a suitable solvent that is inert under polymerization conditions and that normally has a boiling point above the process temperature. Examples of solvents that can be used are butyl acetate, aliphatic, cycloaliphatic, and aromatic hydrocarbons, and also mixtures of these. The monomers in the desired ratios are added to these solutions, and polymerization is carried out with the addition of one or more preferably peroxidic free-radical initiators at temperatures of from 50° C. to 120° C., usually within a period of 4 to 8 hours. It is desirable to maximize conversion. It is preferable to use peresters such as tert-butyl perocotate. The initiator concentration depends on the number of desired grafting sites and on the desired chain lengths of the segments B. Initiator concentration is generally from 0.2 to 3.0% by weight, based on the polymer.

It is also possible to make concomitant use of chain-transfer agents in order to establish the desired molecular weight of the segments B. Examples of suitable chain-transfer agents are sulphur chain-transfer agents, in particular chain-transfer agents comprising mercapto groups, e.g. those listed in the section relating to polymer type B. The concentrations of chain-transfer agents are generally from 0.1 to 1.0% by weight, based on the entire polymer. Another method for the production of the graft polymers CB provides hydroperoxidation of a polyolefin as first step. The hydroperoxide groups thus formed, located in the chain, can initiate graft polymerization of the vinyl monomers in a subsequent stage. (cf. H. A. J. Battaerd, G. W. Tregear, Polymer Reviews loc. cit.).

In a particular embodiment it is possible to graft polymer type B simultaneously onto polymer type A and onto polymer type C in order to produce the graft copolymers AB and CB. The pendant chains B here have the same (statistical) composition. Homopolymers of the polymer type B are formed in parallel therewith.

The polymer types AB and CB can alternatively also be blended, but simultaneous synthesis is preferred here because this gives a more stable dispersion. Phase separation can be less problematic than in the case of simple blending.

In a third alternative, the polymer type AB is synthesized in the presence of the previously grafted polymer type CB, of the ungrafted polymer type C and of the polymer type B formed during synthesis of polymer type CB. In this procedure it is possible that additional pendant chains are formed on polymer type CB and that additional polymers CB are formed. It is therefore actually possible that polymer type CB is present with pendant chains B of different composition.

Analogously, and with analogous effects, it is also possible to synthesize the polymer type CB in the presence of the polymer types AB, A and B.

The coating composition of the invention can also comprise, alongside the stated polymer types A, B, AB, C and CB, other components such as adhesion promoters, stabilizers, abrasion improvers or antioxidants. Examples of these additional materials based on polymers are the polymer types E and $E_A$.

A formulation with polymer type E is an option for improving aluminium adhesion: Improvement of Al adhesion can be observed after priming of the foil or after addition of from 0.1 to 10% by weight, preferably from 0.1 to 5% by weight, of an adhesion-improving terpolymer to the lacquer formulation. An example of the product used is VINYLITE® VMCH (marketed by Union Carbide).

Polymer type $E_A$ can optionally be added in order to reduce possible abrasion during processing. An example of a material that can be used is a polyamide, e.g. of the VESTOSIND® 2159 type (Evonik Ind. AG). The proportion of this added in a formulation can be from 0.1 to 10% by weight, preferably from 0.1 to 5% by weight.

The Solvent System

The coating composition of the invention also comprises a solvent system L, alongside the polymer types A, B and C and the optional graft polymers AB and CB, and also other optional added substances.

The selection of the solvents to be used for the solvent system L is to be such that they meet the requirements of coating technology for plastics and metals. The solvents to be used—optionally a mixture—are to be inert and the entire mixture is to be nonhazardous, with a boiling point that ideally does not exceed 105° C. at 760 torr.

An example of solvent that can be used is a mixture of esters of aliphatic carboxylic acids with aliphatic alcohols, ketones, and aliphatic hydrocarbons. Examples of aliphatic carboxylic acids are acetic acid and propanoic acid. Aliphatic alcohols that can be used are ethanol, propanol, isopropanol, n-butanol, 2-butanol, 2-methyl-1-propanol, and 2-methyl-2-propanol. Suitable examples of ketones are acetone and ethyl methyl ketone. Particular examples of aliphatic hydrocarbons are pentane, hexane, heptane, octane, isooctane, nonane, decane, undecane, and dodecane. The aliphatic hydrocarbons can also take the form of their isomer mixtures or of intermixtures. It is also possible to use cycloalkanes and substituted cycloalkanes.

Mixtures of the solvents described above can also be used for the carrier system. The proportion of the solvent system, based on the polymer dispersions concentrated in the invention, can by way of example be 75% by weight, or in a particularly advantageous case as little as 30% by weight, preferably less than 67% by weight, in practical situations mostly from 55% by weight to 40% by weight.

Other materials that can moreover be added to the heat-sealable coating system suitable for the sealing of various types of substrates are, as described, the auxiliaries and additives usually used for heat-sealing.

Surprisingly, it has been found that only the correct combination of the three physically and also optically incompatible materials A, B and C leads to a sufficiently transparent coating on transparent polyester foils for food. Production of a coating on a transparent polyester foil either from the respective individual materials or from a mixture of two materials never achieves the desired combination of all of the properties. By way of example, a coating based on the polymer type A still has adequate adhesion and very good transparency on polyester foils (PET36) and has certain sealing properties with respect to amorphous polyester pot material (APET), but sealing with respect to polystyrene (PS) is completely lost. The polymer types B and C exhibit inadequate adhesion properties on PET36 foil.

Preference is given to mixtures in which, alongside the polymer types A, B and C, at least one of the graft copolymers AB and CB is present, or particularly AB and CB are present. If all three of the polymer types are mixed together at an elevated temperature (80° C.), without addition of these graft copolymers, there is often the possibility of demixing of the resultant organic dispersion during storage. Another mixing procedure is then required before this dispersion can be applied as binder to the foils.

The required functionality of the binder can be achieved only by proceeding according to the invention. To this end it is preferable that the three polymer types are compatibilized by using an itaconic-acid-containing polyester of the polymer type A, onto which the (meth)acrylate monomers are particularly preferably grafted during the production process. It is further preferable to create a further compatibility component via partial grafting of (meth)acrylate monomers onto the polymer type C so that, in the most ideal case at the end of the production process, all three of the polymer types are present alongside one another in organic solvents and cannot undergo demixing caused by differences in densities and in polarities. On the other hand, use of the polymer type C brings about microphase separation in the dried lacquer, in particular by virtue of the long aliphatic polymer chains. Surprisingly, the separation of the polymer type A is in particular responsible for providing a sufficient number of adhesion groups for bonding to films, in particular to polyester-based films. On the other hand, the phase separation must be prevented from causing visible clouding of the transparent packaging films. Use of styrene-based rubbers, in particular of SEBS materials, or mixtures of SEB materials and SEBS materials, or acrylic-acid-, methacrylic-acid-, maleic-acid-, or maleic-anhydride-grafted SEBS rubber materials reduces the difference in optical properties between polyesters and poly(meth)acrylates on the one hand and ethylene-butene constituents on the other hand. The styrene-containing blocks here can render the polymers optically and physically compatible with the polyesters and poly(meth)acrylates used. Chemical bonding of the styrene-containing blocks to the polyolefinic structures of the polymer type C ensures the combination of phase separation and optical compatibility of the polymer types A, B and C. By virtue of the same functional principle it is also possible for the binders to achieve adhesion on non-polar films, for example biaxially stretched polypropylene films (BOPP), and sealing with respect to polypropylene pot materials (PP). The adhesion and sealing properties described are provided here by the separate, non-polar polymer constituents of the polymer type C.

Surprisingly, therefore, the system of the invention finally also provides the advantage that sealing can be achieved without addition of adhesion promoters, particularly without addition of adhesion promoters based on polyvinyl chloride (PVC) or based on polyester, and that barrier properties and sealing properties achieved with respect to PS containers and PET containers are nevertheless at least comparable and sometimes better than those achieved with heat-sealable systems already available on the market. At the same time, compliance is achieved with the requirement that the lid foil can easily be peeled from the pot ("smooth peel").

The present invention also provides, alongside the coating composition described, a process for the sealing of two materials with the aid of the coating composition of the invention.

Particular features of this process for the sealing of polyester foils or PET-coated foil with respect to polystyrene, polyester and polyvinyl chloride are that the foil is coated with the coating system of the invention, the coating is dried, and the coated side of the foil is placed onto the material that is to be sealed, made of polystyrene, polyester or PVC, and is sealed at a temperature of from 120 to 220° C. and under a pressure of from 1 to 6 MPa for a period of from 0.1 to 1.5 s.

The drying here can take place at reduced pressure, preferably at a temperature above the highest boiling point of the components of the solvent system.

The process of the invention gives heat-sealable coating compositions in dispersion which have adequate stability for processing. The dispersions are stable for at least a plurality of days, normally a plurality of weeks to months.

This provides many application sectors for the coating systems of the invention. Particular importance is attached to uses of coating systems as claimed which can heat-seal polyester foils or PET-coated foils with respect to polystyrene, polyester and polyvinyl chloride. Coating systems according to specific embodiments of the present invention may be used in the heat-sealing of polyester foil, and also aluminium foil and aluminium- and PET-coated foils with respect to polystyrene, polyester and polyvinyl chloride. The coating systems according to other embodiments may be used in the heat-sealing of polyester foil, and also aluminium foil and aluminium- and PET-coated foils with respect to polystyrene, polyester and polyvinyl chloride.

Having generally described this invention, a further understanding can be obtained by reference to certain specific examples which are provided herein for purposes of illustration only, and are not intended to be limiting unless otherwise specified.

EXAMPLES

The examples given below illustrate the present invention, without restricting the invention to the features disclosed therein.

Materials

Foil Material Used:

paper/aluminium/polyester-foil-composite foil (e.g. Flexpap, Constantia)

PET foil, thickness 36 μm, both sides untreated, transparent. The haze value of this foil itself is 9.2%. The foil is obtainable by way of example from Mitsubishi Polyester Films.

Composite aluminium/polyester foil (AlPET) from Fernholz

The BOPP foil was purchased from Constantia and corona-pretreated on the external side.

Pot Material Used:

Thermoformable polystyrene foils from Fernholz,

Amorphous polyethylene terephthalate (APET) from Fernholz

Thermoformable polypropylene (PP) foils from Fernholz

Application of Heat-Sealable Solution in the Laboratory:

Manual coaters (doctoring systems) from MTV Messtechnik were used to apply the heat-sealable solution (wet-layer thickness 24 μm and 20 μm). Resultant dry layer thicknesses here were from 4 μm to 7 μm and from 2 to 4 μm.

Drying of Coated Foils in the Laboratory:

After a short period of air-drying (from 5 to 10 minutes), the foils were dried in a convection oven at from 120° C. to 200° C. for 15 seconds.

Heat-Sealing and Determination of Seal Seam Strength:

Heat-sealing equipment (HSG/ET) from Brugger was used to carry out the sealing processes.

Sealing Conditions:

1. Sealing of paper/metPET foil, aluminium foil, AlPET foil and PET36 foil with respect to PS pot materials and APET pot materials Temperature: 180° C.
Pressure: 3 bar
Time: 0.5 sec
Sealing area: 100 mm×10 mm 2. Sealing of paper/metPET foil, aluminium foil, AlPET foil and PET36 foil with respect to PP pot materials Temperature: 200° C.
Pressure: 6 bar
Time: 1 sec 3. Sealing of BOPP foil with respect to APET, PP and PS pot materials Temperature: 160° C.
Pressure: 3 bar
Time: 0.5 sec Seal seam strength was determined by cutting samples into strips of width 15 mm and using a tensile tester from Instron, model No. 1195, or Zwick, model No. 1454 to subject these to tension at velocity 100 mm/min. Care was taken that during the peel test the angle between the foil parts already separated and the as yet unstressed remainder was 90°.

Solids content (SC) is determined in a drying oven (1 h at 105° C.).

Dynamic viscosity is determined with a Brookfield LVDV-II+Pro viscometer at 23° C. with spindle III at 6 rpm.

Transparency is determined with Haze-Gard Plus equipment from Byk-Gardner on the 36 mm PET foil coated with 5 g/m² of sample material in accordance with ASTM D1003-13.

Materials Used for the Dispersions:

Component A (Polyester):

Table 1 lists the characteristics of the copolyesters (type A1 and A2) used here as examples of component A. The materials here are semiaromatic, linear copolyesters with and without itaconic acid, based on the total quantity of polycarboxylic acids.

TABLE 1

Characteristics of the polyesters used

| Polyester | Itaconic acid content | $T_g$ | $M_w$ |
|---|---|---|---|
| Type A1 | 3.0 mol % | 33° C. | 15 800 |
| Type A2 | 0 mol % | 30° C. | 40 900 |

By way of example, DYNACOLL EP 415.02 (Evonik) can be used as polyester of the type A1.

By way of example, DYNAPOL L 323 (Evonik) can be used as polyester of the type A2.

Component B (monomers used for the production of the poly(meth)acrylates):

Methyl methacrylate (MMA), >99%, unstabilized from Evonik Industries AG n-Butyl methacrylate (nBMA), >99%, unstabilized from Evonik Industries AG Isobornyl methacrylate (IBOMA) from Evonik Industries AG Methacrylic ester of hydrogenated, hydroxypropyl-terminated polybutadienes with molar mass from 4500 g/mol to 5000 g/mol (from Sartomer); styrene stabilized with from 10 to 15 ppm of p-tert-butylcatechol, from Brenntag.

Component C (Rubbers):

Styrene-rubber materials used

TABLE 2

Overview of properties of rubber types used

| Rubber | Styrene content [% by weight] | Structure* | MFI [g/10 min] |
|---|---|---|---|
| Type 1 | 30 | SBS [I, B] | 10[2)] |
| Type 2 | 30-32 | SEBS [I, B] | 10[2)] |
| Type 3 | 30% | MA-g-SEBS | 22[1)] |
| Type 4 | 13 | SEB/SEBS = 30/70 | 22[1)] |

*I: linear,
B: block structure;
[1)] 230° C., 5 kg,
[2)] 200° C., 5 kg

MFI: melt flow index; it should be noted here that the MFI of the types 3 and 4 is also between 1 and 40 g/10 min when measured at 200° C.

An example of rubber materials of the type 1 that can be used is Kibiton PB 5903 from Chimei Corp.

Rubber materials of the type 2 can be obtained by way of example from Kraton (G 1650 and G 1652), from Versalis (Europrene SOL TH 2311 and Europrene SOL TH 2312) or from DYNASOL (Calprene H 6120 and Calprene H 6170).

Rubber materials of the type 3 used are maleic-anhydride-grafted SEBS rubbers with from 1.4 to 2.0% by weight maleic acid content, e.g. from Kraton (FG 1901 G).

Rubber materials of the type 4 used can be a mixture of SEB-di- and SEBS-triblock copolymer, e.g. from Kraton (G 1657 M).

Inventive Example 1

58.3 g of butyl acetate and 57.5 g of macroalcohol methacrylate were used as initial charge at 115° C. in a jacketed vessel with attached thermostat, reflux condenser, blade stirrer and internal thermometer, and initiated with 1.15 g of tert-butylperoxy 2-ethylhexanoate (Peroxan PO) dissolved in 10.0 g of butyl acetate. After 5 minutes, a solution of 23.0 g of styrene, 8.6 g of MMA and 15.0 g of butyl acetate was added dropwise to this solution over a period of 60 minutes. After three hours, 287.5 g of a polyester solution composed of 35.4 g of the polyester type 1, 92.0 g of the polyester type 2 and 175.1 g of propyl acetate was added to the resultant reaction mixture. Once the internal temperature had been reset to 115° C., a solution of 25.9 g of MMA and 0.63 g of Peroxan PO in 20.0 g of butyl acetate was metered into the system over a period of 60 minutes. 30 minutes and 90 minutes after metering had ended, 0.23 g of Peroxan PO in 5.0 g of butyl acetate was in each case used for post-initiation. 240 minutes after the final post-initiation, the reaction mixture was cooled (<30° C.) and filtered through a nylon textile (mesh width 125 μm).

Example 2

58.7 g of SEBS rubber of the type 3 were dissolved over a period of 2 hours in a solution of 65.6 g of the polyester type 2, 22.1 g of the polyester type 1 and 288.2 g of propyl acetate at 98° C. in a jacketed vessel with attached thermostat, reflux condenser, blade stirrer and internal thermometer. 0.44 g of Peroxan PO dissolved in 8.3 g of propyl acetate was then added to the solution, and after a further 5 minutes metering of a solution of 44.0 g of MMA, 44.0 g of nBMA and 1.32 g of Peroxan PO in 14.6 g of propyl acetate was begun at 98° C. and continues for a period of 90 minutes. The polymerization was completed by adding, to the reaction mixture after 30 minutes, 90 minutes and 150 minutes, in each case 0.176 g of Peroxan PO in each case dissolved in 8.3 g of propyl acetate at 98° C. After a further 180 minutes, the mixture was cooled and filtered through a nylon sieve (mesh width 125 μm).

Example 3

The production process uses the procedure and the raw material quantities used in inventive Example 2. 51.8 g of the rubber of the type 4 were dissolved instead of the rubber of the type 3, and the quantity of solvent for dissolving the polyesters and the rubber was adjusted to 281.0 g.

Example 4

The production process uses the procedure and the raw material quantities used in inventive Example 2. 58.7 g of the type 2 were used instead of the rubber of the type 3.

Example 5

92.25 g of SEBS rubber of the type 2 were dissolved over a period of 2 hours in a solution of 120.0 g of polyester type 2, 18.4 g of polyester type 1 and 464.8 g of propyl acetate at 98° C. in a jacketed vessel with attached thermostat, reflux condenser, blade stirrer and internal thermometer. 0.692 g of Peroxan PO dissolved in 13.0 g of propyl acetate was then added to the solution, and after a further 5 minutes metering of a solution of 69.1 g of MMA, 69.1 g of nBMA and 2.076 g of Peroxan PO in 23.0 g of propyl acetate was begun at 98° C. and continues for a period of 90 minutes. The polymerization was completed by adding, to the reaction mixture after 30 minutes, 90 minutes and 150 minutes, in each case 0.277 g of Peroxan PO in each case dissolved in 13 g of propyl acetate at 98° C. After a further 180 minutes, the mixture was cooled and filtered through a nylon sieve (mesh width 125 μm).

Example 6

102.5 g of SEBS rubber of the type 2 were dissolved over a period of 2 hours in a solution of 121.0 g of polyester type 2, 32.8 g of polyester type 1 and 511.0 g of propyl acetate at 98° C. in a jacketed vessel with attached thermostat, reflux condenser, blade stirrer and internal thermometer. 0.769 g of Peroxan PO dissolved in 13.0 g of propyl acetate was then added to the solution, and after a further 5 minutes metering of a solution of 84.0 g of MMA, 69.7 g of nBMA and 2.306 g of Peroxan PO in 23.0 g of propyl acetate was begun at 98° C. and continues for a period of 90 minutes. The polymerization was completed by adding, to the reaction mixture after 30 minutes, 90 minutes and 150 minutes, in each case 0.308 g of Peroxan PO in each case dissolved in 13 g of propyl acetate at 98° C. After a further 180 minutes, the mixture was cooled and filtered through a nylon sieve (mesh width 125 μm).

Example 7

112.8 g of SEBS rubber of the type 2 were dissolved over a period of 2 hours in a solution of 110.7 g of the polyester type 2, 36.9 g of the polyester type 1 and 393.9 g of propyl acetate at 98° C. in a jacketed vessel with attached thermostat, reflux condenser, blade stirrer and internal thermometer. 0.748 g of Peroxan PO dissolved in 13.0 g of propyl acetate was then added to the solution, and after a further 5 minutes metering of a solution of 74.8 g of MMA, 74.8 g of nBMA and 2.245 g of Peroxan PO in 23.0 g of propyl acetate was begun at 98° C. and continues for a period of 90 minutes. The polymerization was completed by adding, to the reaction mixture after 30 minutes, 90 minutes and 150 minutes, in each case 0.299 g of Peroxan PO in each case dissolved in 13 g of propyl acetate at 98° C. After a further 180 minutes, the mixture was cooled, diluted with 117.2 g of ethyl acetate and filtered through a nylon sieve (mesh width 125 μm).

Example 8

112.8 g of SEBS rubber of the type 2 were dissolved over a period of 2 hours in a solution of 115.2 g of the polyester type 2, 32.8 g of the polyester type 1 and 511.0 g of propyl acetate at 98° C. in a jacketed vessel with attached thermostat, reflux condenser, blade stirrer and internal thermometer. 0.746 g of Peroxan PO dissolved in 13.0 g of propyl acetate was then added to the solution, and after a further 5 minutes metering of a solution of 54.1 g of MMA, 74.6 g of nBMA, 20.5 g of IBOMA and 2.239 g of Peroxan PO in 23.0 g of propyl acetate was begun at 98° C. and continues for a period of 90 minutes. The polymerization was completed by adding, to the reaction mixture after 30 minutes, 90 minutes and 150 minutes, in each case 0.298 g of Peroxan PO in each case dissolved in 13 g of propyl acetate at 98° C. After a further 180 minutes, the mixture was cooled and filtered through a nylon sieve (mesh width 125 μm).

Comparative Example CE1 (with EPDM Instead of Polymer Type C)

65.0 g of Dutral CO 043, 26.0 g of polyester of the type 1 and 104.0 g of polyester of the type 2 and also 120.0 g of a suitable emulsifier were used as initial charge in 335 g of propyl acetate and also 60.0 g of cyclohexane (CH) in a jacketed vessel with attached thermostat, reflux condenser, blade stirrer and internal thermometer, and the mixture was stirred at 95° C. until all of the material had dissolved. 2.60 g of tert-butylperoxy 2-ethylhexanoate was then admixed with a mixture of 64.9 g of methyl methacrylate and 64.9 g of butyl methacrylate, and the resultant mixture was metered into the system over a period of 1.5 h at 95° C. by means of a metering pump. Once addition had ended, a further 0.26 g of tert-butylperoxy 2-ethylhexanoate was added on each of two occasions separated by 1 hour, and the mixture was stirred for a further 2 hours. The reaction mixture was cooled and then filtered through a nylon filter (mesh width 125 μm).

Dutral CO 043 was an EPDM.

Comparative Example CE2 (with SBS Instead of Polymer Type C)

The production process uses the procedure and the raw material quantities used in inventive Example 2. 58.7 g of the rubber of the type 1 (SBS rubber) were used instead of the rubber of the type 3.

Comparative Example CE3 (without Polymer Type B)

113.4 g of polyester type 2 and 20.0 g of polyester type 1 were dissolved in 300.0 g of propyl acetate at 98° C. in a jacketed vessel with attached thermostat, reflux condenser, blade stirrer and internal thermometer. 66.6 g of SEBS rubber of the type 2 were then added and dissolution of the mixture was continued for a further 2 h. The reaction mixture cannot be filtered through a nylon filter (mesh width 125 μm) after cooling.

Comparative Example CE4 (without Polymer Type A)

136.5 g of SEBS rubber of the type 2 were dissolved at 98° C. over a period of 2 h in a jacketed vessel with attached thermostat, reflux condenser, blade stirrer and internal thermometer. 1.367 g of Peroxan PO dissolved in 13.0 g of propyl acetate were added to this solution, and after 5 minutes metering of 136.5 g of MMA, 136.9 g of nBMA and 4.012 g of Peroxan PO dissolved in 23.0 g of propyl acetate was begun and continues for a period of 90 minutes. The polymerization was completed by adding, to the reaction mixture after 30 minutes, 90 minutes and 150 minutes, in each case 0.547 g of Peroxan PO in each case dissolved in 13 g of propyl acetate at 98° C. After a further 180 minutes, the mixture was cooled, further diluted with 267.5 g of propyl acetate for viscosity adjustment, and then filtered through a nylon sieve (mesh width 125 μm).

Comparative Example CE5 (Without Polymer Type B)

66.6 g of SEBS rubber of the type 2 were used as initial charge in 300.0 g of propyl acetate in a jacketed vessel with attached thermostat, reflux condenser, blade stirrer and internal thermometer, and 133.4 g of polyester type 2 were slowly added thereto. The mixture was heated to 98° C. and then homogenized over a period of 240 minutes. The reaction mixture cannot be filtered through a nylon filter (mesh width 125 μm) after cooling.

Experimental Results

TABLE 3

Properties of the materials of the Examples:

| Example | Solids [%] | Dyn. viscosity [mPas] | Appearance | Comment |
|---|---|---|---|---|
| Inv. Ex. 1 | 43.9 | 1400 | white, cloudy | — |
| Inv. Ex. 2 | 39.9 | 4100 | slightly yellowish, milky | — |
| Inv. Ex. 3 | 37.5 | 3500 | milky | — |
| Inv. Ex. 4 | 40.4 | 15 000 | slightly yellowish, milky | — |
| Inv. Ex. 5 | 40.5 | 19 000 | milky | — |
| Inv. Ex. 6 | 39.1 | 25 000 | milky | — |
| Inv. Ex. 7 | 40 | 5900 | slightly yellowish, milky | — |
| Inv. Ex. 8 | 40 | 18 000 | milky | — |
| CE1 | 47.5 | 2900 | milky | — |
| CE2 | 42.5 | 3800 | slightly yellowish, milky| | — |
| CE3 | 39.8 | 1000 | contains agglomerates, cloudy, phase separation | not filterable |
| CE4 | 32.9 | 60 | cloudy, phase separation | — |
| CE5 | 39.7 | 1500 | contains agglomerates, cloudy, phase separation | not filterable |

All of the Inventive Examples produced have solids-viscosity ratios which on the one hand ensure processability for users and on the other hand meet the requirement to maximize solids contents. In contrast, it is often impossible to carry out further processing of the Comparative Examples.

Heat-Sealing Properties

TABLE 4

Heat-seal-seam-strength values of the Inventive Examples sealed with respect to PS pot material

| Foil | Example | Inv. Ex. 1 | Inv. Ex. 2 | Inv. Ex. 3 | Inv. Ex. 4 |
|---|---|---|---|---|---|
| Paper/ metPET | HSS [N/15 mm] | 2.9 | 8.1 | 8.9 | 7.8 |
| | Appearance of seal | uniform | slightly uneven | rel. uniform | uneven |
| Aluminium foil | HSS [N/15 mm] | 2.3 | 6.8 | 9.7 | 11.4 |
| | Appearance of seal | uniform | rel. uniform | rel. uniform | slightly uneven |
| AlPET | HSS [N/15 mm] | 3.2 | 7 | 8.1 | 9.4 |
| | Appearance of seal | uniform | rel. uniform | uneven | uneven |
| PET36* | HSS [N/15 mm] | 2.7 | 6.5 | 6.3 | 5.8 |
| | Appearance of seal | uniform | uneven | uneven | uneven |
| | Transparency [% haze] | 15.4 | 17 | 11.3 | 16.7 |

| Foil | Example | Inv. Ex. 5 | Inv. Ex. 6 | Inv. Ex. 7 | Inv. Ex. 8 |
|---|---|---|---|---|---|
| Paper/ metPET | HSS [N/15 mm] | 8.2 | 7.7 | 8.1 | 8.3 |
| | Appearance of seal | uneven | uneven | uneven | rel. uniform |

TABLE 4-continued

Heat-seal-seam-strength values of the Inventive Examples sealed with respect to PS pot material

| | | | | | |
|---|---|---|---|---|---|
| Aluminium foil | HSS [N/15 mm] | 9.3 | 11.6 | 10.4 | 9.8 |
| | Appearance of seal | slightly uneven | rel. uniform | rel. uniform | uniform |
| AIPET | HSS [N/15 mm] | 8.5 | 9.2 | 8.9 | 8.4 |
| | Appearance of seal | slightly uneven | uneven | uneven | rel. uniform |
| PET36* | HSS [N/15 mm] | 6.2 | 6 | 7.3 | 6.4 |
| | Appearance of seal | uneven | uneven | uneven | uneven |
| | Transparency [% haze] | 7.7 | 17.9 | 17.6 | 12.8 |

*PET36 film was stabilized with TESA film for determination of seal seam strength

TABLE 5

Heat-seal-seam-strength values of the Comparative Examples sealed with respect to PS pot material

| | | Example | | | | |
|---|---|---|---|---|---|---|
| Foil | | CE1 | CE2 | CE3 | CE4 | CE5 |
| Paper/ metPET | HSS [N/15 mm] | 6.6 | 1.5 | 3 | <1, dl | 2.3 |
| | Appearance of seal | uniform | slightly uneven | uneven | slightly uneven | uneven |
| Aluminium foil | HSS [N/15 mm] | 7.1 | 4.7 | 4.4 | 2 | 5.4 |
| | Appearance of seal | uniform | rel. uniform | rel. uniform | uniform | slightly uneven |
| AIPET | HSS [N/15 mm] | 7.2 | 2.1 | 4.5 | <1, dl | 4.3 |
| | Appearance of seal | uniform | rel. uniform | rel. uniform | rel. uniform | slightly uneven |
| PET36* | HSS [N/15 mm] | 5.5 | <1 | 2.6 | <1 | 1.4 |
| | Appearance of seal | uniform | n.d. | uneven | n.d. | uneven |
| | Transparency [% haze] | 26 | 11.5 | 13.2 | 9.5 | 12.6 |

*PET36 film was stabilized with TESA film for determination of seal seam strength
rel. uniform = relatively uniform
dl = delamination of sealable layer from film material

TABLE 6

Heat-seal-seam-strength values of the Inventive Examples with respect to APET pot

| Foil | Example | Inv. Ex. 1 | Inv. Ex. 2 | Inv. Ex. 3 | Inv. Ex. 4 |
|---|---|---|---|---|---|
| Paper/ metPET | HSS [N/15 mm] | 2.7 | 7.5 | 8.6 | 6.2 |
| | Appearance of seal | uniform | slightly uneven | slightly uneven | uneven |
| Aluminium foil | HSS [N/15 mm] | 2.5 | 6.1 | 8.5 | 10.2 |
| | Appearance of seal | uniform | rel. uniform | rel. uniform | slightly uneven |
| AIPET | HSS [N/15 mm] | 3.4 | 8.1 | 8.2 | 6.9 |
| | Appearance of seal | uniform | rel. uniform | rel. uniform | uneven |
| PET36* | HSS [N/15 mm] | 2.8 | 5.7 | 6.0 | 5.0 |
| | Appearance of seal | uniform | uneven | uneven | uneven |
| | Transparency [% haze] | 15.4 | 17 | 11.3 | 16.7 |

| Foil | Example | Inv. Ex. 5 | Inv. Ex. 6 | Inv. tx. 7 | Inv. tx. 8 |
|---|---|---|---|---|---|
| Paper/ metPET | HSS [N/15 mm] | 6.9 | 7.6 | 7.8 | 6.8 |
| | Appearance of seal | uneven | slightly uneven | uneven | uneven |
| Aluminium foil | HSS [N/15 mm] | 9.7 | 10.7 | 11.3 | 9.6 |
| | Appearance of seal | slightly uneven | rel. uniform | rel. uniform | rel. uniform |
| AIPET | HSS [N/15 mm] | 7.9 | 8.1 | 9.4 | 7.6 |
| | Appearance of seal | slightly uneven | rel. uniform | uneven | slightly uneven |
| PET36* | HSS [N/15 mm] | 4.6 | 5.8 | 6.3 | 5.4 |
| | Appearance of seal | uneven | uneven | uneven | uneven |
| | Transparency [% haze] | 7.7 | 17.9 | 17.6 | 12.8 |

*PET36 film was stabilized with TESA film for determination of seal seam strength
rel. uniform = relatively uniform

TABLE 7

Heat-seal-seam-strength values of the Comparative Examples with respect to APET pot

| Foil | | Example | | | | |
|---|---|---|---|---|---|---|
| | | CE1 | CE2 | CE3 | CE4 | CE5 |
| Paper/ metPET | HSS [N/15 mm] | 7.0 | 1.0 | 4.6 | <1, dl | 6.5, dl |
| | Appearance of seal | uniform | slightly uneven | uneven | slightly uneven | uneven |
| Aluminium foil | HSS [N/15 mm] | 8.1 | 3.3 | 4.2 | 3.1 | 5.6 |
| | Appearance of seal | uniform | rel. uniform | uneven | slightly uneven | slightly uneven |
| AIPET | HSS [N/15 mm] | 7.8 | 1.9 | 7, dl | <1, dl | 7.2, dl |
| | Appearance of seal | uniform | rel. uniform | slightly uneven | rel. uniform | slightly uneven |
| PET36* | HSS [N/15 mm] | 5.1 | <1 | 4.3, dl | <1 | 2.5, dl |
| | Appearance of seal | uniform | n.d. | slightly uneven | n.d. | uneven |
| | Transparency [% haze] | 26 | 11.5 | 13.2 | 9.5 | 12.6 |

*PET36 film was stabilized with TESA film for determination of seal seam strength
rel. uniform = relatively uniform
dl = delamination of sealable layer from film material

TABLE 8

Heat-sealing properties of Inv. Ex. 2 sealed with respect to PP pot

| Foil | PET36 | Aluminium foil | AIPET |
|---|---|---|---|
| HSS [N/15 mm] | 4.3 | 6.1 | 4.2 |
| Appearance of seal | rel. uniform | uniform | uniform |

TABLE 9

Heat-sealing properties of Inv. Ex. 2 on corona-treated BOPP foil

| Pot | PS | PP | APET |
|---|---|---|---|
| HSS [N/15 mm] | 5.9 | <1 | 3.5 |
| Appearance of seal | uniform | n.d. | uniform |

European patent application EP16169889 filed May 17, 2016, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A heat-sealable coating system, comprising:
a film-forming dispersion which comprises a total of from 25% by weight to 65% by weight of a mixture of components A, B and C,
wherein said mixture comprises
from 15% to 50% by weight of a polyester or polyester mixture as polymer A,
from 15% to 50% by weight of a poly(meth)acrylate or mixture of two or more poly(meth)acrylates as polymer B, and
from 15% to 40% by weight of one or more rubbers comprising repeating styrene units as polymer C, based in each case on the entire composition of the polymers A, B and C,
wherein components A, B and/or C may optionally entirely or to some extent be in a form of graft copolymers AB or CB,
wherein polymer C is an SEBS, a grafted SEBS, an SEB, a copolymer comprising styrene and (meth)acrylates having at least 12 carbon atoms as alkyl moiety, a copolymer comprising styrene and (meth)acrylates having a hydrogenated, hydroxy-terminated polybutadiene as the alkyl moiety or a mixture of at least two of these components,
and wherein the solids content of the dispersion is from 25 to 70% by weight.

2. The coating system according to claim 1, wherein the polymer A is a polyester A1 with number-average molar mass Mn from 700 to 5000 g/mol produced with copolycondensation of itaconic acid, a polyester A2 with number-average molar mass Mn from 5000 to 50 000 g/mol having no double bonds or a mixture of the two polyesters A1 and A2.

3. The coating system according to claim 2, wherein polymer A is a mixture of the two polyesters A1 and A2, wherein
the number-average molar mass Mn of polyester A1 is from 2000 to 4000 g/mol,
the number-average molar mass Mn of polyester A2 is from 10 000 to 35 000 g/mol, and wherein the coating system comprises, based on the entire composition of the polymer A, B, C, inclusive of the potential constituents AB and CB, from 1% by weight to 15% by weight of the polyester A1 and from 10% by weight to 50% by weight of the polyester A2.

4. The coating system according to claim 2, wherein the itaconic-acid-containing polyester A1 comprises a proportion of from 0.1 to 20 mol % of itaconic acid, based on the total quantity of polycarboxylic acids copolycondensed.

5. The coating system according to claim 1, comprising the polymers AB and CB, wherein the polymer AB and the polymer CB are graft copolymers having a main chain of polyester and of rubber, respectively and having pendant chains made of poly(meth)acrylate.

6. The coating system according to claim 1, wherein component C is an SEBS, an SEBS grafted with acrylic acid, an SEBS grafted with methacrylic acid, an SEBS grafted with maleic acid and/or with maleic anhydride, or is a mixture of SEBS and SEB.

7. The coating system according to claim 1, wherein component C comprises a proportion of from 8 to 45% by weight of repeating styrene units.

8. The coating system according to claim 1, wherein the melt flow index of component C, measured with 5 kg load at a temperature of 200° C. in accordance with ISO 1133-1, is from 1 to 40 g/10 min.

9. The coating system according to claim 1, wherein the dispersion comprises, in total, from 35% by weight to 60% by weight of a mixture of components A, B and C, where this mixture comprises from 25% by weight to 45% by weight of a polyester or polyester mixture as polymer A,
から 25% by weight to 45% by weight of a poly(meth)acrylate or mixture of two or more poly(meth)acrylates as polymer B and
from 20% by weight to 35% by weight of one or more rubbers comprising repeating styrene units as polymer C, based in each case on the entire composition of the polymer A, B and C.

10. The coating system according to claim 1, wherein the dispersion comprises, in total, from 40% by weight to 55% by weight of a mixture of components A, B and C, where this mixture comprises from 30% by weight to 40% by weight of a polyester or polyester mixture as polymer A,
from 30% by weight to 40% by weight of a poly(meth)acrylate or mixture of two or more poly(meth)acrylates as polymer B and
from 25% by weight to 30% by weight of one or more rubbers comprising repeating styrene units as polymer C, based in each case on the entire composition of the polymer A, B and C.

11. The coating system according to claim 1, wherein the polymer B is a copolymer obtained via copolymerization of a monomer mixture comprising components selected from (meth)acrylic acid, hydroxyethyl (meth)acrylate, hydroxypropyl (meth)acrylate, methyl (meth)acrylate, n- and/or isopropyl (meth)acrylate, n-butyl (meth)acrylate and C8- to C22-fatty alcohol esters of (meth)acrylic acid.

12. A process for the sealing of polyester foils or PET-coated foil to polystyrene, polyester and polyvinyl chloride, said process comprising:
coating the foil with a coating system according to claim 1, to obtain a coating,
drying the coating, and
placing the coated side of the foil onto the material that is to be sealed, made of polystyrene, polyester or PVC, and
sealing at a temperature of from 120 to 220° C. and under a pressure of from 1 to 6 MPa for a period of from 0.1 to 1.5 s.

* * * * *